H. R. ELLIS.
RESILIENT WHEEL.
APPLICATION FILED NOV. 18, 1909.
980,226.
Patented Jan. 3, 1911.
2 SHEETS—SHEET 2.
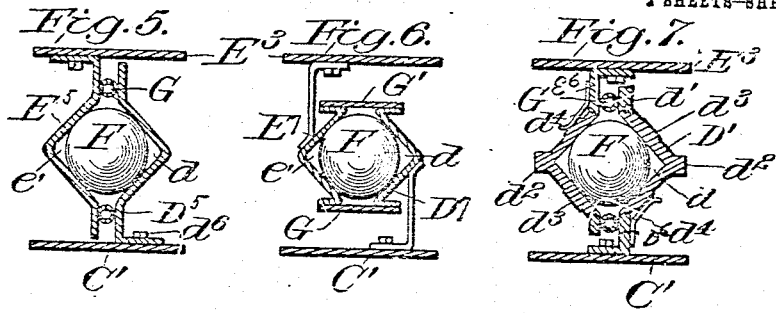
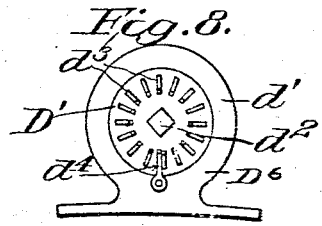
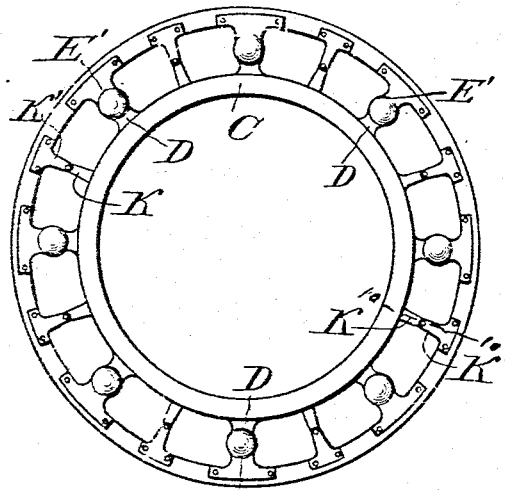
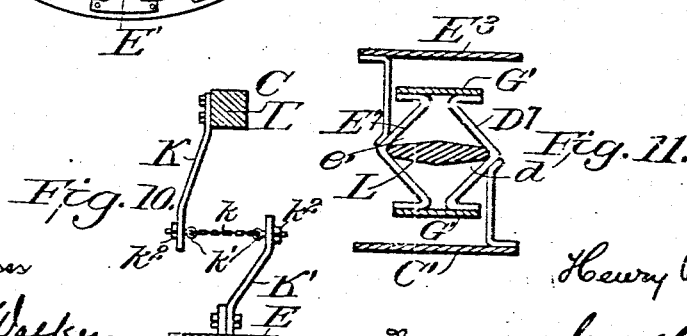
Witnesses
C. N. Walker.
G. M. Copenhaver.
Inventor
Henry R. Ellis
By Geo. H. Evans
Attorney

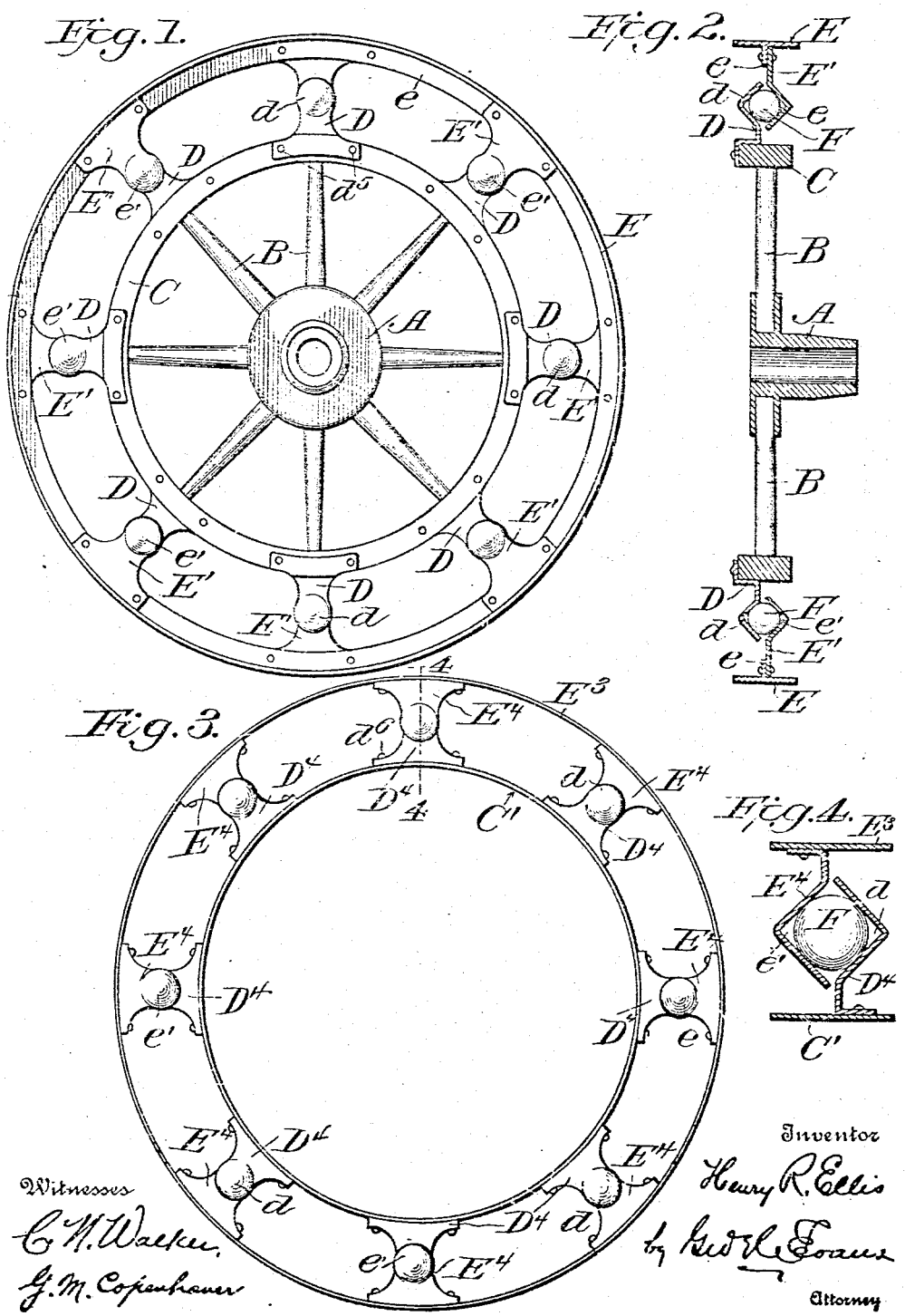

UNITED STATES PATENT OFFICE.

HENRY R. ELLIS, OF SALT LAKE CITY, UTAH.

RESILIENT WHEEL.

980,226.  Specification of Letters Patent.  Patented Jan. 3, 1911.

Application filed November 18, 1909. Serial No. 528,781.

*To all whom it may concern:*

Be it known that I, HENRY R. ELLIS, a citizen of the United States, residing at Salt Lake City, in the county of Salt Lake and State of Utah, have invented certain new and useful Improvements in Resilient Wheels, of which the following is a specification.

My invention relates to resilient wheels. The object of the invention is to provide a wheel having inner and outer concentric members between which are resilient balls so mounted that each ball is subjected at the same time to compressing and shearing forces and each ball sustains the same weight at every point of turn of the wheel; the weight sustained by each ball being proportionate to the number of balls in the wheel and the load applied to the wheel.

A further object is to provide in such a wheel means whereby the balls perform the above functions and also the further function of holding the two members of the wheel or tire together against lateral separation.

These objects I accomplish by the construction shown in the accompanying drawing in which:—

Figure 1 is a side elevation of a wheel containing my improvements; Fig. 2 is a vertical section thereof; Fig. 3 is a side elevation of a tire removed from the wheel and containing my improvements; Fig. 4 is a detail section thereof; Figs. 5, 6, 7 and 8 are details of modifications to be hereinafter described; Fig. 9 is a side elevation of a further modification where the brackets are not in staggered alternate relation and the wheel members are held together by chains; Fig. 10 is a section on line 10—10, of Fig. 9, Fig. 11 is a section through a further modification.

A, designates the hub, B, the spokes and C the felly of the wheel and these may be of any suitable construction and materials. The felly C, is provided at opposite sides with radially disposed outwardly projecting brackets D, in staggered relation to each other and having concavities $d$ of suitable size and form in their inner faces.

E, is the tire proper or tread having a central annular web or flange $e$ on its inner side from which project inwardly, the staggered brackets E', having concavities $e'$ on their inner faces. The brackets D, E', overlap and alternate on opposite sides of the wheel and their concavities register and form sockets or pockets in which are placed balls F of suitable resilient material, such as rubber, and these balls may be solid or hollow as desired.

Owing to the brackets of the inner and outer members of the wheel alternating, with their recesses facing each other, the balls will hold the said members together and the centers of the balls will be in direct line with the vertical centers of the wheel members—of course were the brackets of each member all on one side the balls could not hold the members together, but by alternating the brackets at opposite sides, as described, the balls alone will form the holding means. The brackets D, are secured to the rim by transverse bolts $d^5$, or in any other preferred manner.

In Figs. 3 and 4 the invention is shown as a tire rather than in a complete wheel, and $E^3$ is the tire proper or tread surface, while C', is the inner member or rim $D^4$, $E^4$, are the staggered alternating brackets, and F the balls. The brackets are secured in place by the vertical bolts $d^6$ extending through their base flanges. In Fig. 5 an annular elastic washer G, is placed between the two brackets $D^5$, $E^5$, to prevent the entrance of foreign matter, while in Fig. 6 the outer edges of the conical brackets are surrounded by an elastic band G' to protect the ball from the action of foreign matter. These tires may be shaped to fit the standard wheels to which pneumatic tires are now applied and their treads may be studded or covered with a solid rubber tire, if desired.

In Figs. 7 and 8 the brackets $D^6$ $E^6$ are formed with threaded openings $d'$ and the concavities $d$, are formed in threaded cones or plugs D' which are concaved on their inner faces for this purpose, while at their outer ends squared wrench-receiving projections $d^2$, are formed. Thus the cones or plugs D' may be screwed in to any desired adjustment and to retain them in their adjusted position their outer sides are provided with ribs or indentations $d^3$ with which the free end of a spring $d^4$ engages. By my improved construction each ball receives the same load at every point of turn of the wheel. The resiliency of the wheel is due not only to the compressing of the balls, but is largely increased by the shearing effect upon the balls. The balls hold the two members together and prevent them from rotating one on the other while allowing free yielding movement in every direction.

Broadly stated, the inner and outer members C, E, of Figs. 1 and 2, and their connecting brackets and balls may be termed a tire just as the members C', E³, of the other figures, and their connecting brackets and balls constitute tires.

Referring now to Fig. 9, it will be seen that the brackets D, are all on the same side of the member C, while the brackets E', are all on the same side of member E, the two sets of brackets being opposite each other to form the ball pockets e', for the balls F. In order therefore, to retain the wheel members together I provide the members C E, with opposed brackets K, K', between the brackets D, E', and these brackets are connected by short chains k, provided at their ends with eye bolts k', having nuts k², at the outer sides of the brackets by means of which the chains may be adjusted to hold the wheel members and their ball carrying brackets in proper relation.

In Fig. 11 is shown a mechanism which may be employed between the brackets D, E', of Fig. 1. This mechanism comprises brackets D⁷ E⁷ within the concavities of which is placed a rocking rod L to yieldingly spaced the members C', E³, or C, E. The rounded ends of the rods L of Fig. 11, are loosely mounted in the conical sockets in the brackets and afford a yielding or loose connection which serve to space the wheel members.

What I claim is:—

1. In a wheel, two concentric members having overlapping parts provided in their meeting faces with registering laterally opposed half-pockets and resilient balls seated in the said pockets and subjected simultaneously to a compressing and shearing action therein and each ball sustaining the same weight at every point of turn of the wheel.

2. In a wheel, two concentric members having alternating overlapping parts and individual resilient balls seated in laterally opposed pockets formed in the meeting faces of said overlapping parts and holding the two members yieldingly together.

3. In a wheel, inner and outer members provided with laterally opposed cup-like concavities having their axes parallel to the axis of the wheel and individual rubber cushions within the pockets formed by said concavities and constructed to receive simultaneously a compressing and shearing action and each cushion sustaining the same weight at every point of the wheel; said cushions also cushioning the wheel members against lateral strains.

4. In a wheel, two angular concentric members each having brackets on opposite sides alternating with each other, and provided with registering concavities, resilient balls in the pockets formed by said concavities, and annular guards protecting the pockets and balls.

5. In a resilient wheel, a pair of parallel brackets having registering threaded apertures, half sockets screwed into said apertures with their concavities facing each other, and a rubber cushion between the said half sockets.

In testimony whereof I affix my signature in presence of two witnesses.

HENRY R. ELLIS.

Witnesses:
F. J. NICHOLS,
GEO. W. CRISMON.